United States Patent [19]

Senshu

[11] Patent Number: 4,901,301

[45] Date of Patent: Feb. 13, 1990

[54] REGION DETECTION SYSTEM FOR DETECTING EMPTY SECTORS ON A RECORDING MEDIUM

[75] Inventor: Susumu Senshu, Saitama, Japan

[73] Assignee: Pioneer Electronic Corporation, Tokyo, Japan

[21] Appl. No.: 201,153

[22] Filed: Jun. 2, 1988

[30] Foreign Application Priority Data

Jun. 18, 1987 [JP] Japan .................................. 62-151983

[51] Int. Cl.$^4$ ................................................ G11B 7/00
[52] U.S. Cl. ..................................................... 369/54
[58] Field of Search ............... 369/53, 54, 58; 360/31, 360/48

[56] References Cited

U.S. PATENT DOCUMENTS

| 4,768,181 | 8/1988 | Ichinose et al. | 369/54 |
| 4,831,611 | 5/1989 | Sasaki et al. | 369/58 |

FOREIGN PATENT DOCUMENTS

| 3611561A1 | 10/1986 | Fed. Rep. of Germany . | |
| 3614795A1 | 12/1988 | Fed. Rep. of Germany . | |
| 55-89921 | 7/1980 | Japan | 369/58 |
| 59-22237 | 2/1984 | Japan | 369/54 |
| 59-65935 | 4/1984 | Japan | 369/58 |

OTHER PUBLICATIONS

German Search Report, #P38 20 590.4 dated Nov. 28, 1988.
European Patent Application #0 216 704-dated 9-19-86.

Primary Examiner—Donald McElheny, Jr.
Attorney, Agent, or Firm—Sughrue, Mion, Zinn, Macpeak & Seas

[57] ABSTRACT

A region detection system for detecting empty sectors on a recording medium, such as an optical disk, suitable for use in a optical disk unit, reads out data from a sector to determine whether the sector is empty. To determine whether a sector is dataless, the sector is read out to reproduce signals which include predetermined signals, such as block synchronizing signals or RF signals, by which the length of data recorded can be recognized. The predetermined signals are detected and a cumulative count is kept. The cumulative count for the region is compared with a predetermined reference value, and the region is recognized as dataless (empty) when the cumulative total is not larger than the reference value, while the region is considered to contain data when the cumulative value exceeds the reference value. In a further embodiment, the reproduced signals are sample by a detector at predetermined intervals, and the cumulative total is increased when the predetermined signals occur at successive intervals. Preferably, the reference value is selected so that it is no larger than a maximum length in which errors can be corrected.

12 Claims, 2 Drawing Sheets

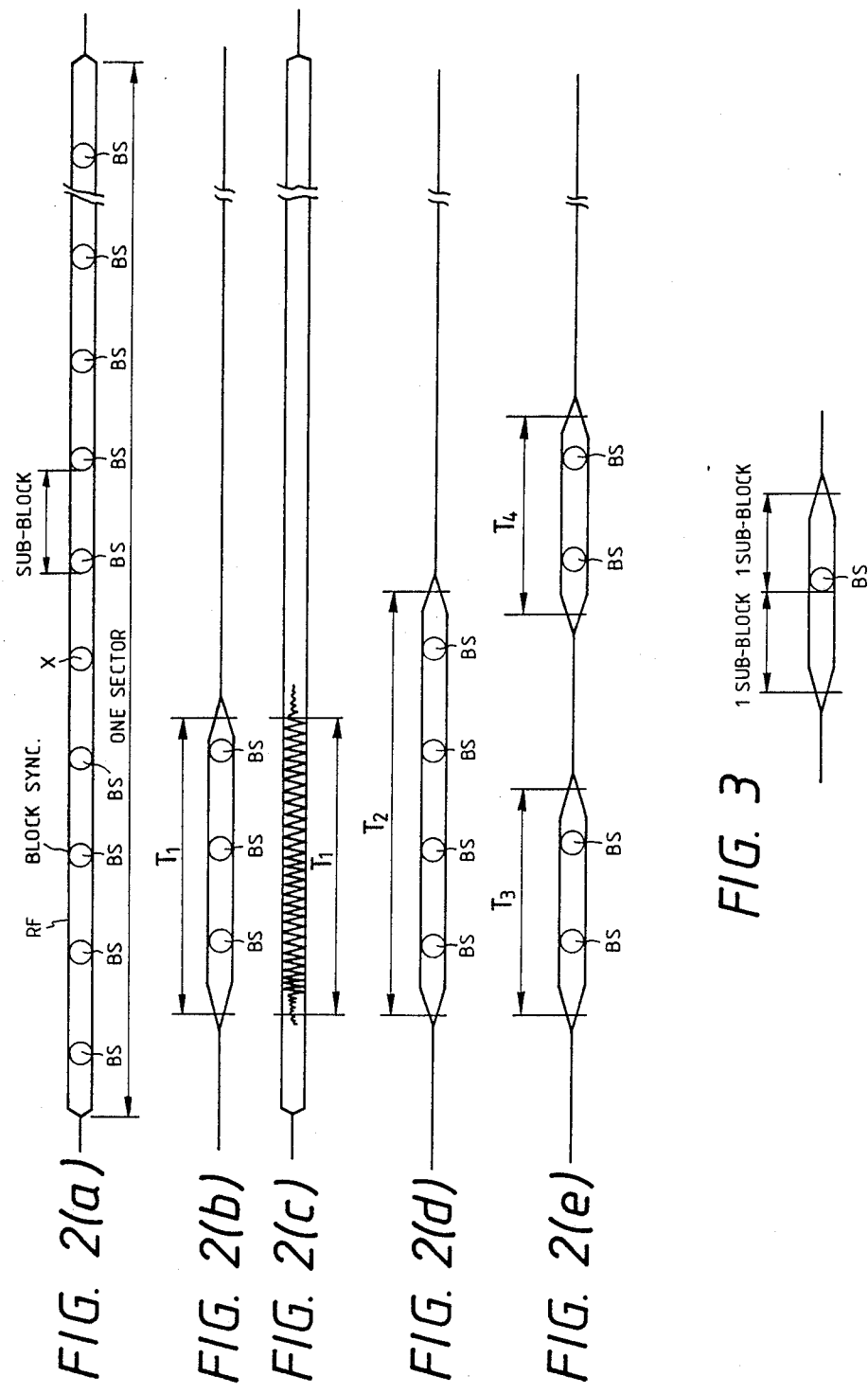

REGION DETECTION SYSTEM FOR DETECTING EMPTY SECTORS ON A RECORDING MEDIUM

The present invention relates to a region detection system which is suitable for use in an optical disk on which information signals are recorded and from which they are reproduced.

A region detection system can be used when recording data on an optical disk. To record data, it is necessary to detect an empty sector (of a track or tracks) on the disk following a previous sector on which data has been recorded. It is also necessary to detect an empty (substitution) sector in which to re-record data when errors in recorded data are greater than a predetermined reference amount. For example, in "verify-reading", errors in newly recorded data are detected, and if the errors are greater than a reference value, the data must be re-recorded in a substitution sector.

To determine whether a sector is empty, it has been proposed to detect block synchronizing signals, which are recorded at a predetermined period (e.g. every sub-block) along with data. If one or more block synchronizing signals are detected in a sector, that sector is considered "recorded" (i.e. it contains data). If no block synchronizing signals are detected, the sector is considered empty ("non-recorded"). However, such a system in which an empty sector is detected based on the absence of block synchronizing signals is apt to be influenced by noise which can cause an empty sector to be erroneously detected as a "recorded" one. As a result, efficiency of sector utilization is reduced.

SUMMARY OF THE INVENTION

It is therefore an object of the present invention to eliminate the foregoing disadvantage of the proposed detection system described above.

It is another object of the present invention to provide a region detection system in which an empty sector or region can be more accurately detected than prior detection systems.

To attain the above objects, in the region detection system according to the present invention, regions (e.g. sectors) are read out to determine whether or not they are empty. For example, the regions which are being read out to determine whether they are empty can correspond to an "error correction unit", i.e. a selected unit (e.g. a sector) for which data is to be corrected. Predetermined signals such as block synchronizing signals or RF signals in which a recording length of the data is recognizable are detected from the reproduced signals, and a total length or number of the predetermined signals for each region is detected. The total number for each region is compared with a predetermined reference value. The region is recognized as a "recorded" one when the total number is larger than the reference value. i.e. the region is considered empty if the total number is equal to or less than the reference value. Preferably, the reference value is chosen so that it is no larger than a maximum length in which errors can be corrected (hereinafter referred to as the "maximum error-correctable length").

BRIEF DESCRIPTION OF THE DRAWINGS

The present invention will be more apparent from the following detailed description when taken in conjunction with the accompanying drawings, in which:

FIGS. 2(a)-2(e) and 3 are diagrams schematically showing waveforms of signals in the disk unit of FIG. 1.

DETAILED DESCRIPTION OF THE PREFERRED EMBODIMENTS

Figure 1:
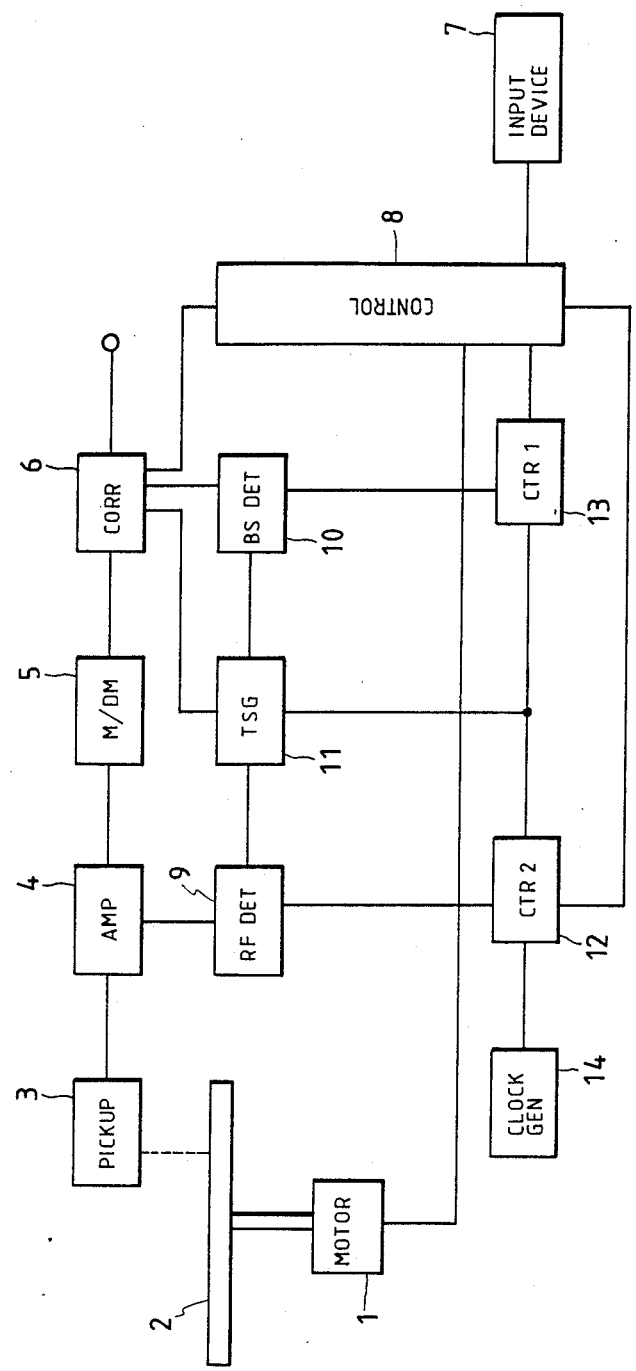
FIG. 1 is a block diagram showing an optical disk unit to which a region detection system according to the present invention is applied.

FIG. 1 shows an optical disk unit in which the region (e.g. a sector) detection system according to the present invention is used. The optical disk unit can be used for reading and recording information on an optical disk 2. When recording information, the optical disk unit must find an empty (dataless) sector, i.e. a sector without data recorded therein, on which to record the information.

The optical disk unit can be placed in a recording mode, e.g. by manually operating an input device 7 (such as a control panel). A control circuit 8 such as a microcomputer responds by instructing a motor 1 to rotate the disk 2. At this time, a pickup device 3 radiates laser light or the like onto the disk 2 and receives light reflected from a track on the disk 2 from which a recorded signal is reproduced. An amplifier circuit 4 amplifies the reproduced recorded (RF) signal outputted by the pickup 3. A modulation-and-demodulation circuit (M/DM) 5 demodulates (for example, using $M^2$-demodulation) the amplified RF signal. A correction circuit (CORR) 6 corrects errors in the demodulated signal and performs processing, such as de-interleaving, of the signal. The output of the correction circuit 6 is applied to the control circuit 8, which reads out data such as an address from the corrected signal.

With reference to FIG. 2(a), a block synchronizing (BS) signal has one bite, and there is one block synchronizing signal in each sub-block of data in each sector. For example, the BS signals can be used to rapidly re-achieve "lock" (synchronization) where a PLL circuit (not shown) for extracting a reproducing clock signal gets out of synchronization.

The signal produced from the correction circuit 6 is also supplied to a detection circuit (BS DET) 10 for detecting block synchronizing signals. A timing signal generation circuit (TSG) 11 generates a window pulse having a predetermined pulse width which is applied to the BS detection circuit 10. The detection circuit 10 supplies a detection pulse to a first counter (CTR 1) 13 if a BS signal is detected in the reproduced signal while the detection circuit 10 is being supplied with the window pulse. The counter 13 counts the number (NP) of the detection pulses. The window pulses from the generation circuit 11 thus ensure that BS signals cannot (erroneously) be detected at positions in the sector where the BS signals should not be found.

The counting is carried out for every region which is regarded (e.g. by the control circuit 8) as "an error correction unit". For example, when interleaving, adding an error correction code, or the like, is being performed for every sector, counting is carried out for every sector. The counter 13 resets the count value when the counting for one sector is completed. Completion can correspond to a pulse produced (once for each sector) from the timing signal generation circuit 11 to represent the end of one sector. The counter 13 repeats the same operation in the next sector.

At the same time as each BS signal is counted, the counter 13 also counts the number (NS) of times that BS signals occur in succession (e.g. two or more times in a row), with each run of BS signals counting as a predetermined number (e.g. one). If desired, runs of more than two BS signals could count as a larger predetermined number.

For example, when three BS signals are successively detected in a section $T_1$ in one sector and no BS signals are detected in the remainder of the sector as shown in FIG. 2(b), the number (NP) of detected BS signals is three (3), and the number of successive signals is one (1). The control circuit 8 adds NP and NS (3 and 1) and compares the sum (4) with a predetermined reference value.

The reference value is set to correspond to the maximum error-correctable length in one sector. Assuming that the maximum error-correctable length is, for example, four sub-blocks, the reference value may be set to four (4).

In this case, the sum is equal to the reference value, and the control circuit 8 recognizes the sector as an empty one. The control circuit 8 can now begin data recording in this sector.

As previously noted, it is important to correctly detect empty sectors. If data recording is performed in a sector in which data is already recorded, data reproduced from this sector will be erroneous due to the other data which have been recorded. This is because double recording cannot be performed on the disk 2. An example of such erroneous recording/reproduction is shown at section $T_1$ in FIG. 2(c). The length of the section $T_1$ should not be longer than the maximum error-correctable length (in this embodiment, the length of the section $T_1$ is equal to the maximum error-correctable length), so that errors in the section $T_1$ can be corrected. There is a possibility that the number of errors will increase as time passes because of time aging or other phenomena. Accordingly, it is preferable to set the reference value smaller than the maximum error-correctable length.

As also noted above, the region detection system is used to find empty sectors for data recording which, for example, would take place as follows. Data to be recorded are supplied to the correction circuit 6 for processing such as interleaving, adding an error correction code, or the like. After the predetermined processing, the data are modulated (for example, using $M^2$-modulation) in the circuit 5. The thus modulated data are supplied to the pickup (e.g. a recording/reproducing device) 3 through the amplifier 4. While controlling the intensity of laser light corresponding to the data, the recording/reproducing device 3 writes the data on the disk 2.

In "verify-reading" (reading of recorded data to verify that it is correct) which is performed immediately after recording, when an error generation state is larger (worse) than a predetermined reference value (e.g. due to a faulty sector on the disk), the same data are recorded again in a substitution sector, as described above. Taking into consideration time aging or the like, the reference value in verify-reading is also set smaller than the maximum error-correctable length. The reference value in detecting an empty sector may be made to correspond to that in verify-reading.

For example, if four BS signals are successively detected in a section $T_2$ as shown in FIG. 2(d), NP is four (4) and NS is one (1), their sum is five (5), which is larger than the reference value of four (4). This sector is thus judged as "recorded". Alternatively, if two BS signals are successively detected in each of sections $T_3$ and $T_4$ in a given sector as shown in FIG. 2(e), NP is four (4) and NS is two (2) in this sector, so their sum of six (6) exceeds the reference value. This sector is thus also judged as "recorded". In the above embodiment, it is possible to only cumulatively detect the number of pulses (NP) without detecting NS. However, if only the number of pulses is detected, or only the number of successive strings of pulses, this sector would be erroneously judged as empty, and the optical device would attempt to record new data thereon. The erroneous state which will result when new data are recorded in this sector is the same as that in the case of the sector as shown in FIG. 2(d). Therefore, although not a requirement of the invention, it is preferable to carry out BS signal detection by detecting and adding both NP and NS in each sector so that a sector having intermittently recorded data, as described above, is not erroneously detected as empty.

In the foregoing embodiment, the reason why one (1) is added to the number NP of BS signals when they occur in succession is that even in the case where only one BS signal is detected, there is a possibility that data are recorded substantially over two sub-blocks such as in the worst case which is shown in FIG. 3. It is a matter of course that the adding of one (1) for a succession of BS signals can be omitted. If the adding of one (1) is omitted, the reference value can be decreased.

Since one BS signal is arranged in one sub-block, it is possible to recognize the length of the recorded data by counting the number of BS signals. Similar to this, it is possible to recognize the length of the recorded data, example, by detecting the RF signal.

To this end, the RF signal produced from the amplifier 4 and a read gate signal produced from the timing signal generation circuit 11 (corresponding to a data recording section) are applied to a detection circuit (RF DET) 9 for detecting RF signals. From those input signals, the detection circuit 9 produces a predetermined detection signal when an RF signal is detected in a period during which the detection circuit 9 is being supplied with the read gate signal. The production of the detection signal is continued while the RF signal is being detected. A second counter (CTR 2) 12 counts the number of clocks generated by a clock generation circuit 14 which occur while the detection signal is being produced from the detection circuit 9. Further, the counter 12 adds the number of clocks for one sub-block to the count value every time a new detection signal is applied to the counter 12. Such a count value of the counter 12 corresponds to the total or cumulative length in which RF signals are detected in one sector. The control circuit 8 converts the count value of the counter 12 into the number of sub-blocks, and compares the number with a reference value in the same manner as in the foregoing case.

In the case of detecting RF signals, a sector in which the number of times of detection of RF signals is large is recognized as a "recorded sector even if each of the RF signals is short." In contrast, in the case of detecting BS signals, there is a possibility that a sector in which a dropout or the like exists (such that no BS signal is detected). In such a case, the sector will be recognized as an empty one, and erroneous data recording will occur, as described above. Accordingly, it is beneficial to detect both RF signals and BS signals instead of detecting only one of them. In this case, an empty sector can be detected more accurately.

Similar to the case where BS signals are detected, when RF signals are detected, only a cumulative total of detected RF signals can be compared with a reference value, or a predetermined number (one) can be added to the cumulative total when a consecutive string or grouping of RF signals is detected. When both RF signals and BS signals are detected, separate counts of RF and BS signals (FIG. 1) can be kept and the determination of whether a sector is empty can be made if either count or if both counts exceed respective reference values. Alternatively, a single count of both RF and BS signals could be kept.

In the region detection system according to the present invention, as described above, in each region regarded as "an error correction unit," data are successively reproduced to obtain reproduced signals which contain predetermined signals. A recording length of the data can be recognized by detecting the predetermined signals from the reproduced signals. A total length of the predetermined signals in each region is detected, and the total length in each region is compared with a predetermined reference value. The region is recognized as a region having data recorded therein when the total length is not larger than the reference value. Accordingly, it is possible to detect an empty region more accurately than prior systems.

What is claimed is:

1. A method for discriminating recording regions on a recording medium as one of a data-recorded region and a data-unrecorded region on the basis of predetermined signals recorded on the medium, the method comprising the steps of:
    detecting the presence of the predetermined signals in a recording region;
    counting a total number of the detected predetermined signals in the region; and
    determining whether data is unrecorded in the region based on a comparison of the total number with a predetermined value.

2. The method of claim 1, wherein the region is dataless when the total number is no greater than the predetermined value.

3. The method of claim 1, wherein the step of detecting is performed at intervals, and the total number of the detected predetermined signals is increased by a predetermined number in response to detection of the predetermined signals in at least two consecutive intervals.

4. The method of claim 1, wherein the predetermined signals comprise block synchronizing signals.

5. The method of claim 1, wherein the predetermined signals comprise RF signals.

6. The method of claim 1, wherein the predetermined signals comprise block synchronizing signals and RF signals.

7. The method of claim 1, wherein the region corresponds to an error detection unit, and the predetermined value is no greater than a maximum length of errors which can be corrected.

8. The method of claim 7, wherein the predetermined value equals the maximum length of errors.

9. A detection device for detecting dataless regions on a recording medium from data signals reproduced from data including predetermined signals recorded in a region on the recording medium, the device comprising:
    means for detecting the presence of the predetermined signals in the reproduced data signals, and for issuing a detection signal in response to detection of each of the predetermined signals;
    means receiving the detection signal for counting a total number of the predetermined signals which are detected in the region; and
    means for determining whether the region is dataless based on a comparison of the total number with a predetermined value.

10. The device of claim 9, further comprising means for issuing clock signals at intervals, and wherein said counting means is further adapted for receiving the clock signals and adding a predetermined number to the total number of the predetermined signals in response to detection of the predetermined signals occurring for at least two consecutive clock signals.

11. The device of claim 9, wherein the region corresponds to an error detection unit, and the predetermined value is no greater than a maximum length of errors which can be corrected.

12. The device of claim 11, wherein the predetermined value equals the maximum length.

* * * * *